US012194959B2

(12) United States Patent
Liu et al.

(10) Patent No.: US 12,194,959 B2
(45) Date of Patent: Jan. 14, 2025

(54) VEHICLE CONTROL DEVICE (71) Applicant: HONDA MOTOR CO., LTD., Tokyo (JP)

(72) Inventors: Haisong Liu, Tokyo (JP); Ryo Morosawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 359 days.

(21) Appl. No.: 17/675,305

(22) Filed: Feb. 18, 2022

(65) Prior Publication Data
US 2022/0281413 A1 Sep. 8, 2022

(30) Foreign Application Priority Data

Mar. 2, 2021 (JP) .................................. 2021-032648

(51) Int. Cl.
*B60R 25/25* (2013.01)
*B60R 25/102* (2013.01)
(Continued)

(52) U.S. Cl.
CPC ............ *B60R 25/25* (2013.01); *B60R 25/102* (2013.01); *B60R 25/305* (2013.01); *B60R 25/31* (2013.01);
(Continued)

(58) Field of Classification Search
CPC ..... B60R 25/25; B60R 25/102; B60R 25/305; B60R 25/31; B60R 25/403; B60R 25/32;
(Continued)

(56) References Cited

U.S. PATENT DOCUMENTS 10,289,288 B2 * 5/2019 Penilla .................... H04W 4/44
10,486,649 B1 11/2019 Bennie et al.
(Continued)

FOREIGN PATENT DOCUMENTS

CN 102596656 A 7/2012
CN 103731577 A 4/2014
(Continued)

OTHER PUBLICATIONS

Chinese Office Action dated Jan. 23, 2024 issued in corresponding Chinese application No. 202210124391.2; English machine translation included (18 pages).

*Primary Examiner* — Neil R McLean
(74) *Attorney, Agent, or Firm* — Rankin, Hill & Clark LLP (57) ABSTRACT

A vehicle control device includes: a peripheral target recognition unit that, based on a detection signal of an object detection sensor, recognizes a target existing around a vehicle; a person determination unit that, when the target is recognized, executes a person determination process of capturing the target with a first camera having a first resolution, and determining whether the target is a person; and a user authentication unit that, when the target is determined to be the person, executes a first user authentication process of capturing a first target person determined to be the person by the person determination unit, with a second camera having a second resolution higher than the first resolution, and collating a face image of the first target (Continued)

person with a face image of a registered user of the vehicle to determine whether the first target person is the registered user.

5 Claims, 4 Drawing Sheets

(51) Int. Cl.
    *B60R 25/30*     (2013.01)
    *B60R 25/31*     (2013.01)
    *B60R 25/40*     (2013.01)
    *G06V 20/59*     (2022.01)
    *G06V 40/16*     (2022.01)
    *B60R 25/32*     (2013.01)

(52) U.S. Cl.
    CPC ............ *B60R 25/403* (2013.01); *G06V 20/59* (2022.01); *G06V 40/172* (2022.01); *B60R 25/32* (2013.01)

(58) Field of Classification Search
    CPC .. B60R 25/2081; G06V 20/59; G06V 40/172; G06V 20/56
    USPC ......................................................... 382/118
    See application file for complete search history.

(56) References Cited

U.S. PATENT DOCUMENTS

| | | | |
|---|---|---|---|
| 11,485,321 B2 * | 11/2022 | Okada ................ | B60R 25/24 |
| 2006/0238549 A1 * | 10/2006 | Marks ................ | G06F 3/0304 |
| | | | 345/633 |
| 2012/0217764 A1 | 8/2012 | Ishiguro et al. | |
| 2014/0104636 A1 | 4/2014 | Baba | |
| 2016/0275337 A1 | 9/2016 | Shibutani | |
| 2016/0277618 A1 | 9/2016 | Horishita | |
| 2018/0165933 A1 | 6/2018 | Siminoff | |
| 2020/0108796 A1 | 4/2020 | Björkengren et al. | |
| 2020/0139931 A1 * | 5/2020 | Mukasa ................ | E05B 49/00 |
| 2020/0342613 A1 * | 10/2020 | Altuev ................ | H04N 23/62 |
| 2021/0152732 A1 | 5/2021 | Eki | |

FOREIGN PATENT DOCUMENTS

| | | |
|---|---|---|
| CN | 105989361 A | 10/2016 |
| CN | 110663247 A | 1/2020 |
| CN | 111002945 A | 4/2020 |
| CN | 111332248 A | 6/2020 |
| JP | 2003-138817 | 5/2003 |
| JP | 2020-25261 A | 2/2020 |

* cited by examiner

VEHICLE CONTROL DEVICE

INCORPORATION BY REFERENCE

The present application claims priority under 35 U.S.C. § 119 to Japanese Patent Application No. 2021-032648 filed on Mar. 2, 2021. The content of the application is incorporated herein by reference in its entirety.

BACKGROUND OF THE INVENTION

Field of the Invention

The present invention relates to a vehicle control device and a vehicle control method.

Description of the Related Art

In the related art, a smart entry system has been proposed that controls entry to a vehicle in a manner of capturing surroundings of the vehicle with an in-vehicle camera and using iris information of a target person extracted from an image of the target person approaching the vehicle to perform user authentication (for example, see Japanese Patent Laid-Open No. 2003-138817).

When the target person approaching the vehicle is recognized by the image captured by the camera as in the smart entry system described above, it is necessary to constantly execute a process of recognizing the target person from the image captured by the camera in preparation for the approach of the target person. Therefore, there is an inconvenience that power consumption of the camera increases.

The present invention has been made in view of such a circumstance, and an object of the present invention is to provide a vehicle control device and a vehicle control method that can reduce power consumption of an in-vehicle camera and accurately recognize a target person existing around a vehicle from an image captured by the in-vehicle camera.

SUMMARY OF THE INVENTION

In order to achieve the above object, a first aspect of the present invention is to provide a vehicle control device including: a peripheral target recognition unit that, based on a detection signal of an object detection sensor mounted on a vehicle to detect an object existing around the vehicle, recognizes a target existing around the vehicle; a person determination unit that, when the target is recognized by the peripheral target recognition unit, executes a person determination process of capturing the target with a first camera and determining based on an image of the target whether the target is a person, the first camera being mounted on the vehicle and having a first resolution; and a user authentication unit that, when the target is determined to be the person by the person determination unit, executes a first user authentication process of capturing, with a second camera, a first target person determined to be the person by the person determination unit and collating a face image of the first target person with a face image of a registered user of the vehicle to determine whether the first target person is the registered user, the second camera being mounted on the vehicle and having a second resolution higher than the first resolution.

In the vehicle control device, the vehicle control device may further include an object detection sensor control unit that, when a ratio of the target determined to be the person by the person determination unit among a plurality of the targets recognized by the peripheral target recognition unit is equal to or less than a predetermined value, executes at least one of a process decreasing detection sensitivity of the object by the object detection sensor, a process of reducing a detection range of the object detection sensor, and a process of prohibiting an operation of the object detection sensor for a predetermined time.

In the vehicle control device, when a determination that the first target person is not the registered user is successively made for a predetermined number of times or more in the first user authentication process, the user authentication unit may prohibit execution of the first user authentication process until the target determined to be the person in the person determination process is not extracted from an image captured by the first camera.

In the vehicle control device, when a determination that the first target person is not the registered user is successively made for a predetermined number of times or more in the first user authentication process, the user authentication unit may stop an operation of the object detection sensor, and execute a second user authentication process of, when an operation of a touch sensor provided on a door of the vehicle is recognized, capturing, with the second camera, a second target person who operates the touch sensor and collating a face image of the second target person with a face image of the registered user to determine whether the second target person is the registered user.

In the vehicle control device, the user authentication unit may transmit a predetermined notification to a user terminal used by the registered user when the user authentication unit determines in the second user authentication process that the second target person is not the registered user.

In the vehicle control device, the user authentication unit may stop an operation of the object detection sensor when the user authentication unit determines in the first user authentication process that the first target person existing around the vehicle is not the registered user after the vehicle is stopped.

In the vehicle control device, the user authentication unit may continue the operation of the object detection sensor when the user authentication unit determines in the first user authentication process that the first target person existing around the vehicle is the registered user after the vehicle is stopped.

In the vehicle control device, the user authentication unit may stop an operation of the object detection sensor when the user authentication unit recognizes from an image captured by the second camera that the registered user gets off from the vehicle, and then the registered user is unrecognizable from the image captured by the second camera.

In order to achieve the above object, a second aspect of the present invention is a vehicle control method to be executed by a computer, the method including: a peripheral target recognition step of, based on a detection signal of an object detection sensor mounted on a vehicle to detect an object existing around the vehicle, recognizing a target existing around the vehicle; a person determination step of, when the target is recognized by the peripheral target recognition step, executing a person determination process of capturing the target with a first camera and determining based on an image of the target whether the target is a person, the first camera being mounted on the vehicle and having a first resolution; and a user authentication step of, when the target is determined to be the person by the person determination step, executing a first user authentication process of capturing, with a second camera, a first target person determined to be the person by the person determination step and collating a face image of the first target person with a face image of a registered user of the vehicle to determine whether the first target person is the registered user, the second camera being mounted on the vehicle and having a second resolution higher than the first resolution.

According to the vehicle control device, since only the process of detecting the object needs to be performed, it is possible to reduce power consumption of the in-vehicle camera and to authenticate the target person existing around the vehicle with accuracy based on the image captured by the in-vehicle camera, by using the object detection sensor having the smaller power consumption than the first camera and the second camera and the first camera having the smaller power consumption than the second camera due to the low resolution in combination with the second camera having the high resolution.

DETAILED DESCRIPTION OF THE PREFERRED EMBODIMENT

1. Configuration of Vehicle

A description will be given with reference to FIG. 1 with respect to a configuration of a vehicle 1 mounted with a vehicle control device 10 of the present embodiment. A front part of the vehicle 1 is provided with a first front camera 40a and a second front camera 40b that capture a front of the vehicle 1. The second front camera 40b has a higher resolution than the first front camera 40a. Further, the second front camera 40b consumes more power consumption than the first front camera 40a.

Further, the front part of the vehicle is provided with a front motion detector 44 and a front irradiation LED 60. The front motion detector 44 detects a target existing in front of the vehicle 1. The front motion detector 44 is a passive infrared ray (PIR) sensor, which detects infrared rays emitted from the target to detect a target such as a person or a small animal. The front motion detector 44 has smaller power consumption than the first front camera 40a. The front irradiation LED 60 is used at the time of capturing with the first front camera 40a and the second front camera 40b at night. The front irradiation LED 60 irradiates a capturing range of the first front camera 40a and the second front camera 40b.

A rear part of the vehicle 1 is provided with a first rear camera 43a and a second rear camera 43b that capture a rear of the vehicle 1. The second rear camera 43b has a higher resolution than the first rear camera 43a. Further, the second rear camera 43b consumes more power consumption than the first rear camera 43a.

Further, the rear part of the vehicle 1 is provided with a rear motion detector 47 and a rear irradiation LED 63. The rear motion detector 47 detects a target existing behind the vehicle 1. The rear motion detector 47 is a PIR sensor, and the rear motion detector 47 has smaller power consumption than the first rear camera 43a. The rear irradiation LED 63 is used at the time of capturing with the first rear camera 43a and the second rear camera 43b at night. The rear irradiation LED 63 irradiates a capturing range of the first rear camera 43a and the second rear camera 43b.

A right side part of the vehicle 1 is provided with a first right side camera 41a and a second right side camera 41b that capture a right side of the vehicle 1. The second right side camera 41b has a higher resolution than the first right side camera 41a. Further, the second right side camera 41b consumes more power consumption than the first right side camera 41a. In addition, the right side part of the vehicle 1 is provided with a welcome light 50 that irradiates a road surface near a driver's door 2 with a guide display 51 toward the driver's door 2. A door handle (not shown) of the driver's door 2 is provided with a touch sensor 55. The touch sensor 55 may be provided on a window frame of the driver's door 2, or may be provided around the first right side camera 41a or the second right side camera 41b.

Further, the right side part of the vehicle 1 is provided with a right side motion detector 45 and a right side irradiation LED 61. The right side motion detector 45 detects a target existing on the right side of the vehicle 1. The right side motion detector 45 is a PIR sensor, and the right side motion detector 45 has smaller power consumption than the first right side camera 41a. The right side irradiation LED 61 is used at the time of capturing with the first right side camera 41a and the second right side camera 41b at night. The right side irradiation LED 61 irradiates a capturing range of the first right side camera 41a and the second right side camera 41b.

A left side part of the vehicle 1 is provided with a first left side camera 42a and a second left side camera 42b that capture a left side of the vehicle 1. The second left side camera 42b has a higher resolution than the first left side camera 42a. Further, the second left side camera 42b consumes more power consumption than the first left side camera 42a.

Further, the left side part of the vehicle 1 is provided with a left side motion detector 46 and a left side irradiation LED 62. The left side motion detector 46 detects a target existing on the left side of the vehicle 1. The left side motion detector 46 is a PIR sensor, and the left side motion detector 46 has smaller power consumption than the first left side camera 42a. The left side irradiation LED 62 is used at the time of capturing with the first left side camera 42a and the second left side camera 42b at night. The left side irradiation LED 62 irradiates a capturing range of the first left side camera 42a and the second left side camera 42b.

Each of the first front camera 40a, the first right side camera 41a, the first left side camera 42a, and the first rear camera 43a corresponds to a first camera of the present disclosure. The resolution of each of the first front camera 40a, the first right side camera 41a, the first left side camera 42a, and the first rear camera 43a corresponds to a first resolution of the present disclosure. Each of the second front camera 40b, the second right side camera 41b, the second left side camera 42b, and the second rear camera 43b corresponds to a second camera of the present disclosure. The resolution of each of the second front camera 40b, the second right side camera 41b, the second left side camera 42b, and the second rear camera 43b corresponds to a second resolution of the present disclosure.

Further, the vehicle 1 is provided with a communication unit 80. The communication unit 80 communicates with a mobile terminal used by a pedestrian located in the vicinity of the vehicle 1, another vehicle, an external server, a roadside machine and the like.

The vehicle control device 10 recognizes a target person U existing around the vehicle 1, based on detection signals of the front motion detector 44, the right side motion detector 45, the left side motion detector 46, and the rear motion detector 47 and images captured by the first front camera 40a, the second front camera 40b, the first right side camera 41a, the second right side camera 41b, the first left side camera 42a, the second left side camera 42b, the first rear camera 43a, and the second rear camera 43b.

Then, when the target person U is authenticated as a user (registered user), who is registered in advance, of the vehicle 1, the vehicle control device 10 executes an entry process to the vehicle 1, for example, lighting of the welcome light 50 or unlocking of the driver's door 2.

2. Configuration of Vehicle Control Device

A configuration of the vehicle control device will be described with reference to FIG. 2. The vehicle control device 10 is input with images captured by the first front camera 40a, the second front camera 40b, the first right side camera 41a, the second right side camera 41b, the first left side camera 42a, the second left side camera 42b, the first rear camera 43a, and the second rear camera 43b. In addition, the vehicle control device 10 is input with detection signals of the target by the front motion detector 44, the right side motion detector 45, the left side motion detector 46, and the rear motion detector.

By the control signal output from the vehicle control device 10, the welcome light 50, the front irradiation LED 60, the right side irradiation LED 61, the left side irradiation LED 62, and the rear irradiation LED 63 are turned on and off, and an operation of a lock mechanism of each door (not shown) is controlled. In addition, the vehicle control device 10 communicates with another vehicle or the like via the communication unit 80.

The vehicle control device 10 is a control unit including a processor 20, a memory 30, an interface circuit (not shown) and the like. The processor 20 corresponds to a computer of the present disclosure. The processor 20 reads and executes a control program 31 stored in the memory 30, thereby functioning as a peripheral target recognition unit 21, a person determination unit 22, a user authentication unit 23, an object detection sensor control unit 24, and a control unit 25.

A process to be executed by the peripheral target recognition unit 21 corresponds to a peripheral target recognition step in a vehicle control method of the present disclosure, and a process to be executed by the person determination unit 22 corresponds to a person determination step in the vehicle control method of the present disclosure. A process to be executed by the user authentication unit 23 corresponds to a user authentication step, and a process to be executed by the object detection sensor control unit 24 corresponds to an object detection sensor control step of the present disclosure.

The peripheral target recognition unit 21 recognizes a target existing around the vehicle 1, based on the detection signals from the front motion detector 44, the right side motion detector 45, the left side motion detector 46, and the rear motion detector 47. The person determination unit 22 captures the target, which is recognized by the peripheral target recognition unit 21, with the first front camera 40a, the first right side camera 41a, the first left side camera 42a, or the first rear camera 43a. Then, the person determination unit 22 executes the person determination process of determining whether the target is a person, based on the feature amount of the image of the target captured with the first front camera 40a, the first right side camera 41a, the first left side camera 42a, or the first rear camera 43a.

The user authentication unit 23 captures a first target person determined to be a person by the person determination unit 22 with the second front camera 40b, second right side camera 41b, the second left side camera 42b, or the second rear camera 43b. Then, the user authentication unit 23 collates a face image of the first target person captured by the second front camera 40b, the second right side camera 41b, the second left side camera 42b, or the second rear camera 43b with a face image of the registered user, which is stored in the memory 30, of the vehicle 1, thereby executing a first user authentication process of determining whether the target person is the registered user.

When the ratio of the target determined to be a person by the person determination unit 22 among the plurality of targets recognized by the peripheral target recognition unit 21 is equal to or less than a predetermined value, the object detection sensor control unit 24 executes at least any one process of the following processes (1) to (3) with respect to the front motion detector 44, the right side motion detector 45, the left side motion detector 46, and the rear motion detector 47: (1) a process of decreasing detection sensitivity of the object; (2) a process of reducing a detection range of the object; and (3) a process of prohibiting the operation for a predetermined time.

When the user authentication unit 23 determines that the target person is the registered user, the control unit 25 executes an entry process to the vehicle 1 such as unlocking of the door of the vehicle 1 according to the position of the user. In the example shown in FIG. 1, since the target person U is close to the driver's door 2, the control unit 25 allows the welcome light 50 to be turned on and executes an entry process of unlocking the driver's door 2 when it is determined that the target person U is the registered user.

3. Vehicle Entry Process

Figure 1:
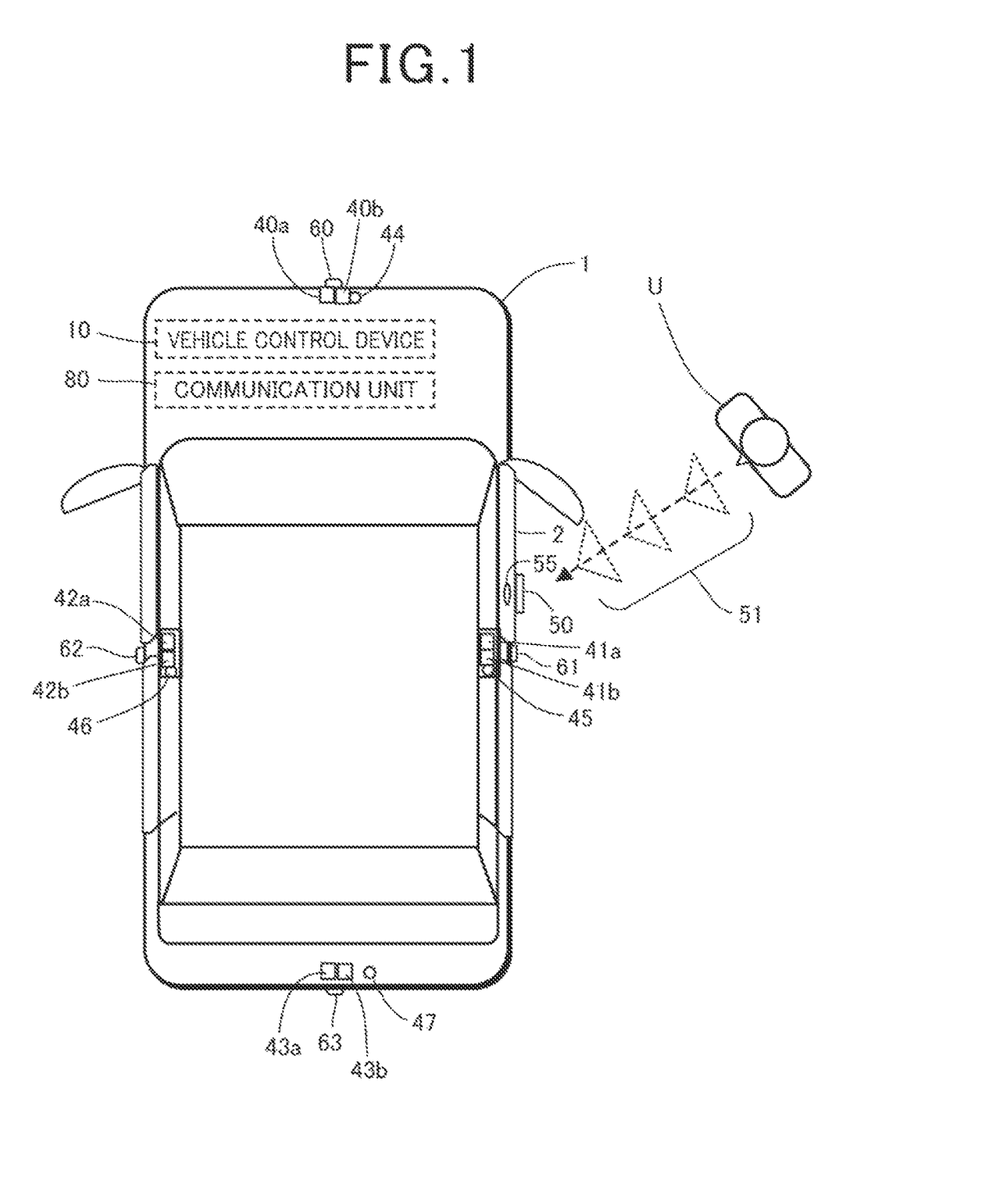
FIG. 1 is a configuration diagram of a vehicle mounted with a vehicle control device.

According to flowcharts shown in FIGS. 3 and 4, as shown in FIG. 1, a description will be given with respect to a vehicle entry process to be executed by the vehicle control device 10 when the target person U as the registered user of the vehicle 1 approaches the driver's door 2 from the right side of the vehicle 1.

In the following description, the front motion detector 44, the right side motion detector 45, the left side motion detector 46, and the rear motion detector 47 are collectively referred to as a motion detector. Further, the first front camera 40a, the first right side camera 41a, the first left side camera 42a, and the first rear camera 43a are collectively referred to as a first camera. In addition, the second front camera 40b, the second right side camera 41b, the second left side camera 42b, and the second rear camera 43b are collectively referred to as a second camera. In addition, the front irradiation LED 60, the right side irradiation LED 61, the left side irradiation LED 62, and the rear irradiation LED 63 are collectively referred to as an irradiation LED.

Figure 3:
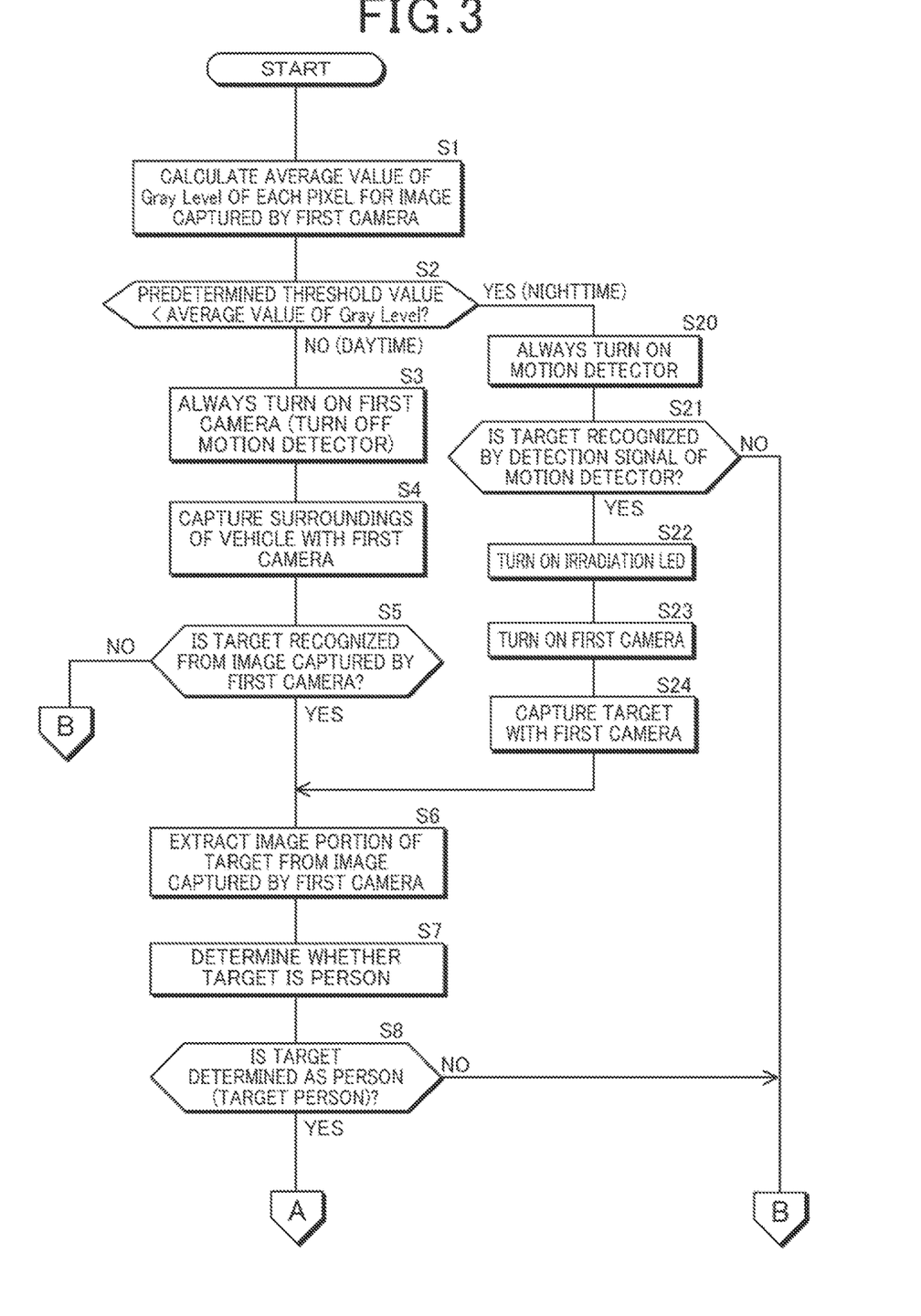
FIG. 3 is a first flowchart of a vehicle entry process.

In step S1 in FIG. 3, the peripheral target recognition unit 21 recognizes illuminance around the vehicle 1 from an image captured by the first camera. Specifically, the peripheral target recognition unit 21 calculates an average value of Gray Level of each pixel for one image captured by the first camera. In subsequent step S2, the peripheral target recognition unit 21 determines whether the average value of Gray Level exceeds a predetermined threshold value. Then, when the peripheral target recognition unit 21 determines that the average value of Gray Level exceeds the predetermined threshold value (when being capable of determining to be nighttime), the process proceeds to step S20, and when the peripheral target recognition unit 21 determines that the average value of Gray Level is equal to or less than the predetermined threshold value (when being capable of determining to be daytime), the process proceeds to step S3.

The peripheral target recognition unit 21 may determine whether to be nighttime or daytime depending on the current time. Alternatively, the vehicle 1 may be provided with an illuminance sensor, and the peripheral target recognition unit 21 may determine whether to be nighttime or daytime based on a detection signal of the illuminance sensor.

In step S20, the peripheral target recognition unit 21 always keeps the motion detector to be in an ON state (operating state). In subsequent step S21, when the peripheral target recognition unit 21 recognizes the target based on the detection signal of the motion detector, the process proceeds to step S22. On the other hand, when the peripheral target recognition unit 21 does not recognize the target, the process proceeds to step S12 in FIG. 4, and in this case, the entry process of the vehicle 1 to be described below is not executed.

In steps S22 and S23, the person determination unit 22 turns on the first camera and the irradiation LED corresponding to the motion detector that has detected the target. In the example of FIG. 1, since the target person U is detected by the right side motion detector 45, the person determination unit 22 turns on the first right side camera 41a and the right side irradiation LED 61. In subsequent step S24, the person determination unit 22 captures the target (here, the target person U) with the first right side camera 41a, and the process proceeds to step S6.

In step S3, the person determination unit 22 always keeps the first camera to be in an ON state (operating state), and always keeps the motion detector to be in an OFF state. In subsequent step S4, the person determination unit 22 captures surroundings of the vehicle 1 with the first camera. In next step S5, when the person determination unit 22 recognizes a target from the image captured by the first camera, the process proceeds to step S6, and when the person determination unit 22 does not recognize the target, the process proceeds to step S15 in FIG. 4. In the example of FIG. 1, the target person U is recognized as a target from the image captured by the first right side camera 41a.

In step S6, the person determination unit 22 extracts an image portion of the target from the image captured by the first right side camera 41a. In subsequent step S7, the person determination unit 22 determines whether the image portion of the target has characteristics of a person and determines whether the target is a person. In next step S8, when the person determination unit 22 determines that the target is the person, the process proceeds to step S9 in FIG. 4, and the person determination unit 22 determines that the target is not the person, the process proceeds to step S15 in FIG. 4.

Figure 4:
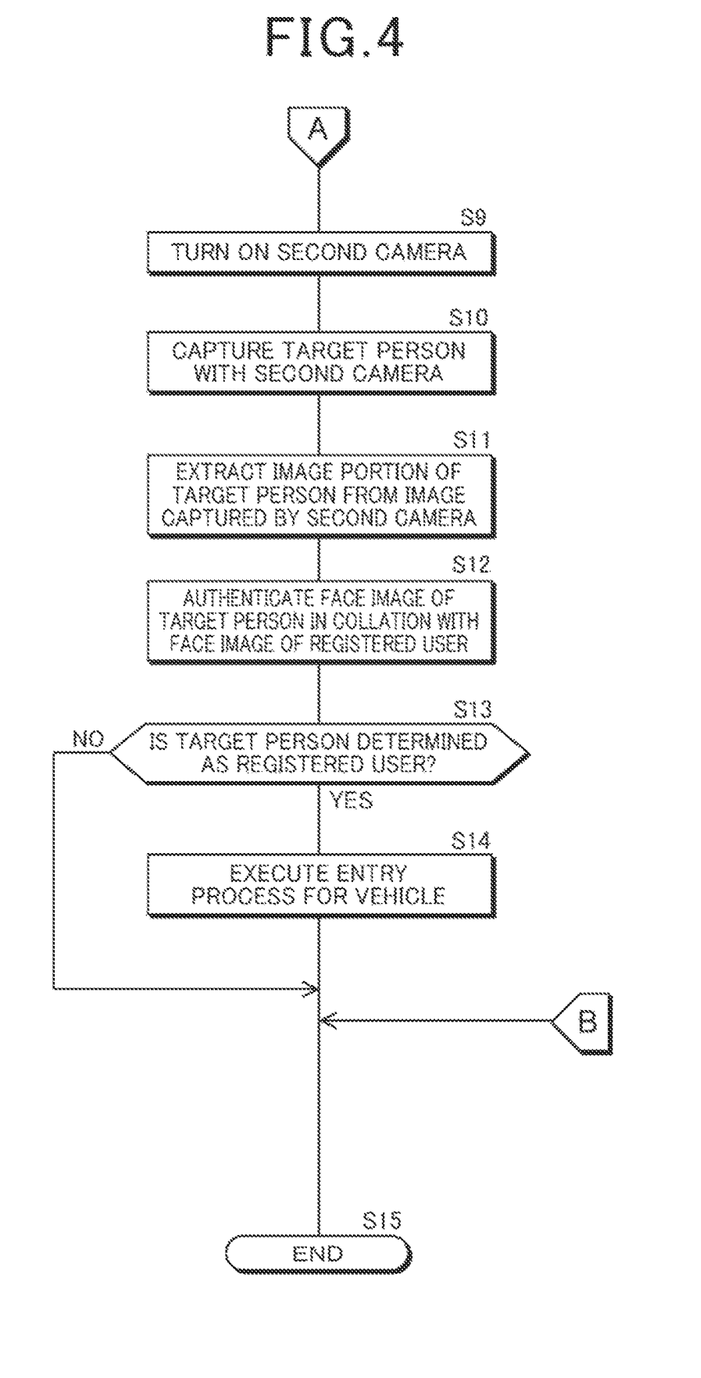
FIG. 4 is a second flowchart of the vehicle entry process.

In step S9 in FIG. 4, the user authentication unit 23 turns on the second right side camera 41b, and captures the target person U with second right side camera 41b in step S10. In subsequent step S11, the user authentication unit 23 extracts an image portion of the target person U from the image captured by the second right side camera 41b. In next step S12, the user authentication unit 23 collates the face image of the target person U with the face image of the registered user stored in the memory 30, and determines whether the target person U is the registered user.

In next step S13, when the user authentication unit 23 determines that the target person U is the registered user, the process proceeds to step S14, and when the user authentication unit 23 determines that the target person U is not the registered user, the process proceeds to step S15. In step S14, the control unit 25 performs lighting of the welcome light 50 and unlocking of the driver's door 2 as an entry process for the vehicle 1.

4. Another Embodiment

In the above-described embodiment, when the determination that the target person is not the registered user is successively made for a predetermined number of times or more in the user authentication process by the user authentication unit 23, the user authentication unit 23 may prohibit the execution of the user authentication process until the target determined to be a person in the person determination process by the person determination unit 22 is not recognized by the peripheral target recognition unit 21.

In the above-described embodiment, when the determination that the target person is not the registered user is successively made for a predetermined number of times or more in the user authentication process, the user authentication unit 23 may stop the operation of the motion detector, and when the operation of the touch sensor 55 is recognized, may capture the target person (corresponding to the second target person of the present disclosure) who operates the touch sensor 55 with the second right side camera 41b to extract an image portion of the target person from the image captured by the second right side camera 41b. Then, the user authentication unit 23 may execute a process (second user authentication process) of collating the face image of the target person with the face image of the registered user to determine whether the target person is the registered user. Further, when the user authentication unit 23 determines in the second user authentication process that the target person is not the registered user, a predetermined notification may be transmitted to the user terminal used by the registered user to notify the existence of a suspicious person or the like.

In the above-described embodiment, when the user authentication unit 23 determines through the user authentication process that the target person existing around the vehicle 1 is not the registered user after the vehicle 1 is stopped, the operation of the motion detector may be stopped. On the other hand, when the user authentication unit 23 determines through the user authentication process that the target person existing around the vehicle 1 is the registered user after the vehicle 1 is stopped, the operation of the motion detector may be continued.

In the above-described embodiment, when the user authentication unit 23 recognizes from the image captured by the second camera that the registered user has got off from the vehicle 1, the operation of the motion detector may be stopped when the registered user cannot be recognized from the image captured by the second camera.

In the above-described embodiment, the PIR sensor is used as the object detection sensor of the present disclosure, but any sensor capable of detecting the target with less power consumption than the first camera may be used as the object detection sensor of the present disclosure without being limited thereto.

In the above-described embodiment, the object detection sensor control unit 24 is provided to perform the process of controlling the operating conditions of the motion detector, but the object detection sensor control unit 24 may not be provided.

In the above-described embodiment, the vehicle control method of the present disclosure is executed by the processor 20 (corresponding to the computer of the present disclosure) provided in the vehicle control device 10, but the vehicle control method of the present disclosure may be executed by a computer or the like constituting the external server that communicates with the vehicle 1. In this case, information of the target existing around the vehicle 1 is transmitted from the vehicle 1 to the external server, and control information is transmitted from the external server to the vehicle 1 to instruct turning-on or off of the welcome light 50, unlocking of the door of the vehicle 1 and the like. In addition, the peripheral target recognition unit 21, the person determination unit 22, the user authentication unit 23, the object detection sensor control unit 24, and the control unit 25 may be distributed to the vehicle control device 10 and the external server.

Figure 2:
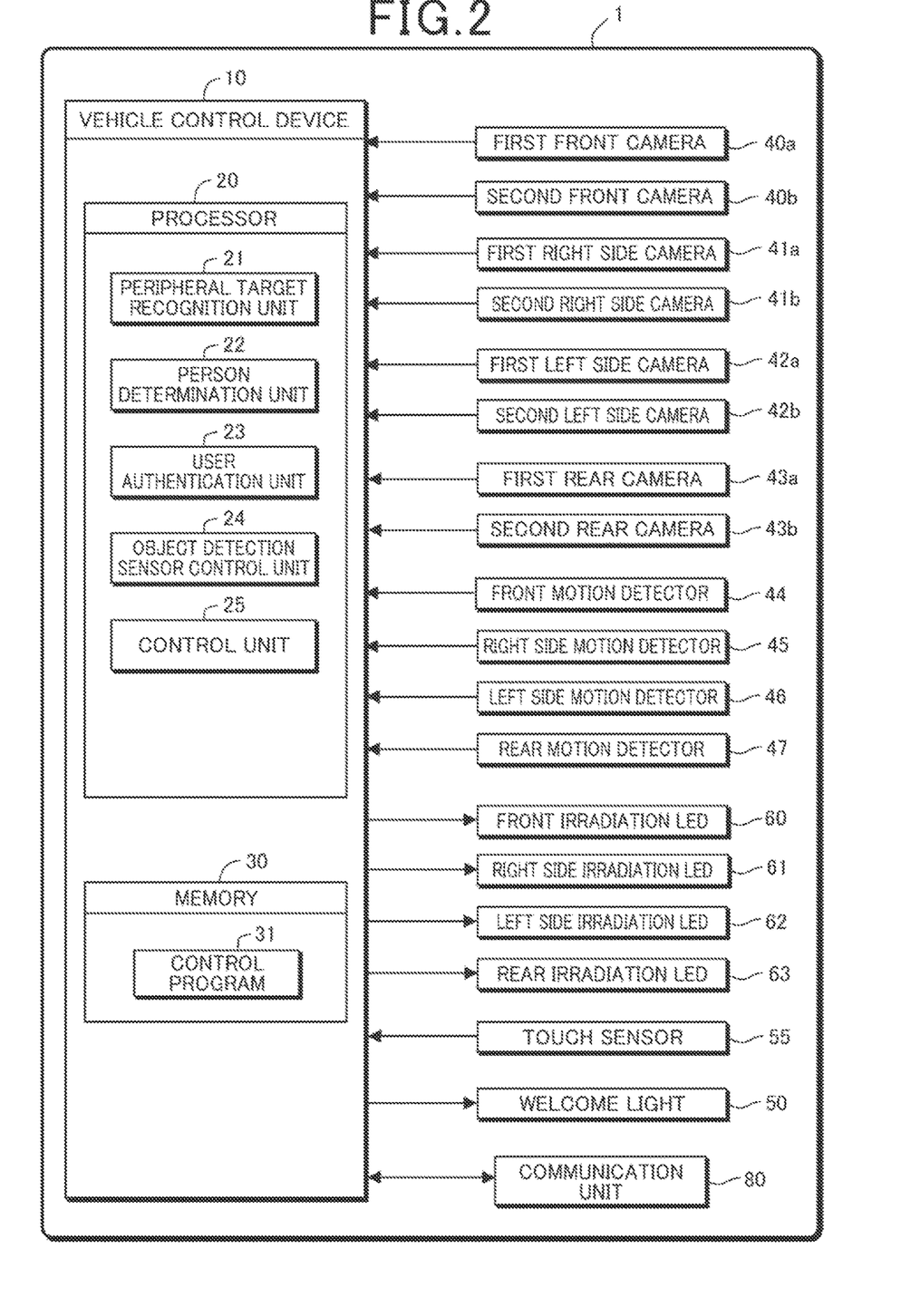
FIG. 2 is a configuration diagram of the vehicle control device.

FIGS. 1 and 2 are the schematic diagrams showing the configurations of the vehicle 1 and the vehicle control device 10 by dividing the configurations depending on main process contents in order to facilitate understanding of the present invention, and the configurations of the vehicle 1 and the vehicle control device 10 may be configured by other divisions. In addition, the process of each of the components may be executed by one hardware unit, or may be executed by a plurality of hardware units. Further, the process of each of the components shown in the flowchart of FIGS. 3 and 4 may be executed by one program, or may be executed by a plurality of programs.

5. Configurations Supported by Embodiment Described Above

The above-described embodiment is a specific example of the following configurations.

(Item 1) A vehicle control device including: a peripheral target recognition unit that, based on a detection signal of an object detection sensor mounted on a vehicle to detect an object existing around the vehicle, recognizes a target existing around the vehicle; a person determination unit that, when the target is recognized by the peripheral target recognition unit, executes a person determination process of capturing the target with a first camera and determining based on an image of the target whether the target is a person, the first camera being mounted on the vehicle and having a first resolution; and a user authentication unit that, when the target is determined to be the person by the person determination unit, executes a first user authentication process of capturing, with a second camera, a first target person determined to be the person by the person determination unit and collating a face image of the first target person with a face image of a registered user of the vehicle to determine whether the first target person is the registered user, the second camera being mounted on the vehicle and having a second resolution higher than the first resolution.

According to the vehicle control device of Item 1, since only the process of detecting the object needs to be performed, it is possible to reduce power consumption of the in-vehicle camera and to authenticate the target person existing around the vehicle with accuracy based on the image captured by the in-vehicle camera, by using the object detection sensor having the smaller power consumption than the first camera and the second camera and the first camera having the smaller power consumption than the second camera due to the low resolution in combination with the second camera having the high resolution.

(Item 2) In the vehicle control device according to Item 1, the vehicle control device further includes an object detection sensor control unit that, when a ratio of the target determined to be the person by the person determination unit among a plurality of the targets recognized by the peripheral target recognition unit is equal to or less than a predetermined value, executes at least one of a process decreasing detection sensitivity of the object by the object detection sensor, a process of reducing a detection range of the object detection sensor, and a process of prohibiting an operation of the object detection sensor for a predetermined time.

According to the vehicle control device of Item 2, when it is assumed that a target such as a small animal other than the person is wandering around the vehicle 1 and the user does not need to be authenticated, it is possible to reduce power consumption for authenticating the registered user by restriction of the operation of the object detection sensor.

(Item 3) In the vehicle control device according to Item 1 or 2, when a determination that the first target person is not the registered user is successively made for a predetermined number of times or more in the first user authentication process, the user authentication unit prohibits execution of the first user authentication process until the target determined to be the person in the person determination process is not extracted from an image captured by the first camera.

According to the vehicle control device of Item 3, when the vehicle 1 is stopped in a place with many passing persons of pedestrians and the target person other than the registered user frequently passes near the vehicle, the execution of the first user authentication process is prohibited, and thus the power consumption of the second camera can be reduced.

(Item 4) In the vehicle control device according to Item 1 or 2, when a determination that the first target person is not the registered user is successively made for a predetermined number of times or more in the first user authentication process, the user authentication unit stops an operation of the object detection sensor, and executes a second user authentication process of, when an operation of a touch sensor provided on a door of the vehicle is recognized, capturing, with the second camera, a second target person who operates the touch sensor and collating a face image of the second target person with a face image of the registered user to determine whether the second target person is the registered user.

According to the vehicle control device of Item 4, when the vehicle 1 is stopped in a place with many passing persons of pedestrians and the target person other than the registered user frequently passes near the vehicle, it is possible to reduce the power consumption due to the operation of the object detection sensor and the first camera after the entry to the vehicle is ensured by the second user authentication process corresponding to the operation of the touch sensor.

(Item 5) In the vehicle control device according to Item 4, the user authentication unit transmits a predetermined notification to a user terminal used by the registered user when the user authentication unit determines in the second user authentication process that the second target person is not the registered user.

According to the vehicle control device of Item 5, it is possible to notify the registered user that the target person other than the registered user is trying to perform the entry to the vehicle.

(Item 6) In the vehicle control device according to any one of Items 1 to 5, the user authentication unit stops an operation of the object detection sensor when the user authentication unit determines in the first user authentication process that the first target person existing around the vehicle is not the registered user after the vehicle is stopped.

According to the vehicle control device of Item 6, since the first target person other than the registered user exists around the vehicle, when it is assumed that the vehicle is stopped in a busy place, the object detection sensor is stopped operating to reduce power consumption.

(Item 7) In the vehicle control device according to Item 6, the user authentication unit continues the operation of the object detection sensor when the user authentication unit determines in the first user authentication process that the first target person existing around the vehicle is the registered user after the vehicle is stopped.

According to the vehicle control device of Item 7, when the registered user exists around the vehicle, it is possible to improve the usability for the registered user by making the entry to the vehicle possible.

(Item 8) In the vehicle control device according to any one of Items 1 to 7, the user authentication unit stops an operation of the object detection sensor when the user authentication unit recognizes from an image captured by the second camera that the registered user gets off from the vehicle, and then the registered user is unrecognizable from the image captured by the second camera.

According to the vehicle control device of Item 8, when the operation of the object detection sensor is stopped at a timing at which the registered user who gets off the vehicle is apart from the vehicle to some extent, the power consumption of the object detection sensor can be reduced.

(Item 9) A vehicle control method to be executed by a computer, the method including: a peripheral target recognition step of, based on a detection signal of an object detection sensor mounted on a vehicle to detect an object existing around the vehicle, recognizing a target existing around the vehicle; a person determination step of, when the target is recognized by the peripheral target recognition step, executing a person determination process of capturing the target with a first camera and determining based on an image of the target whether the target is a person, the first camera being mounted on the vehicle and having a first resolution; and a user authentication step of, when the target is determined to be the person by the person determination step, executing a first user authentication process of capturing, with a second camera, a first target person determined to be the person by the person determination step and collating a face image of the first target person with a face image of a registered user of the vehicle to determine whether the first target person is the registered user, the second camera being mounted on the vehicle and having a second resolution higher than the first resolution.

When the vehicle control method according to Item 9 is executed by the computer, it is possible to obtain the same operational effects as those of the vehicle control device of Item 1.

REFERENCE SIGNS LIST 1 vehicle
2 driver's door
10 vehicle control device
20 processor
21 peripheral target recognition unit
22 person determination unit
23 user authentication unit
24 object detection sensor control unit
25 control unit
30 memory
31 control program
40a first front camera
40b second front camera
41a first right side camera
41b second right side camera
42a first left side camera
42b second left side camera
43a first rear camera
43b second rear camera
44 front motion detector
45 right side motion detector
46 left side motion detector
47 rear motion detector
55 touch sensor
U target person

What is claimed is:

1. A vehicle control device comprising a processor, wherein the processor functions as:
   a peripheral target recognition unit that, based on a detection signal of an object detection sensor mounted on a vehicle to detect an object existing around the vehicle, recognizes a target existing around the vehicle;
   a person determination unit that, when the target is recognized by the peripheral target recognition unit, executes a person determination process of capturing the target with a first camera and determining based on an image of the target whether the target is a person, the first camera being mounted on the vehicle and having a first resolution; and
   a user authentication unit that, when the target is determined to be the person by the person determination unit, executes a first user authentication process of capturing, with a second camera, a first target person determined to be the person by the person determination unit and collating a face image of the first target person with a face image of a registered user of the vehicle to determine whether the first target person is the registered user, the second camera being mounted on the vehicle and having a second resolution higher than the first resolution,
   wherein when a determination that the first target person is not the registered user is successively made for a predetermined number of times or more in the first user authentication process, the user authentication unit prohibits execution of the first user authentication process until the target determined to be the person in the person determination process is not extracted from an image captured by the first camera.

2. A vehicle control device comprising a processor, wherein the processor functions as:
   a peripheral target recognition unit that, based on a detection signal of an object detection sensor mounted on a vehicle to detect an object existing around the vehicle, recognizes a target existing around the vehicle;
   a person determination unit that, when the target is recognized by the peripheral target recognition unit, executes a person determination process of capturing the target with a first camera and determining based on an image of the target whether the target is a person, the first camera being mounted on the vehicle and having a first resolution; and
   a user authentication unit that, when the target is determined to be the person by the person determination unit, executes a first user authentication process of capturing, with a second camera, a first target person determined to be the person by the person determination unit and collating a face image of the first target person with a face image of a registered user of the vehicle to determine whether the first target person is the registered user, the second camera being mounted on the vehicle and having a second resolution higher than the first resolution, wherein when a determination that the first target person is not the registered user is successively made for a predetermined number of times or more in the first user authentication process, the user authentication unit stops an operation of the object detection sensor, and executes a second user authentication process of, when an operation of a touch sensor provided on a door of the vehicle is recognized, capturing, with the second camera, a second target person who operates the touch sensor and collating a face image of the second target person with a face image of the registered user to determine whether the second target person is the registered user.

3. A vehicle control device comprising a processor, wherein the processor functions as:

a peripheral target recognition unit that, based on a detection signal of an object detection sensor mounted on a vehicle to detect an object existing around the vehicle, recognizes a target existing around the vehicle;

a person determination unit that, when the target is recognized by the peripheral target recognition unit, executes a person determination process of capturing the target with a first camera and determining based on an image of the target whether the target is a person, the first camera being mounted on the vehicle and having a first resolution; and a user authentication unit that, when the target is determined to be the person by the person determination unit, executes a first user authentication process of capturing, with a second camera, a first target person determined to be the person by the person determination unit and collating a face image of the first target person with a face image of a registered user of the vehicle to determine whether the first target person is the registered user, the second camera being mounted on the vehicle and having a second resolution higher than the first resolution, wherein the user authentication unit stops an operation of the object detection sensor when the user authentication unit determines in the first user authentication process that the first target person existing around the vehicle is not the registered user after the vehicle is stopped.

4. A vehicle control device comprising a processor, wherein the processor functions as:

a peripheral target recognition unit that, based on a detection signal of an object detection sensor mounted on a vehicle to detect an object existing around the vehicle, recognizes a target existing around the vehicle;

a person determination unit that, when the target is recognized by the peripheral target recognition unit, executes a person determination process of capturing the target with a first camera and determining based on an image of the target whether the target is a person, the first camera being mounted on the vehicle and having a first resolution; and a user authentication unit that, when the target is determined to be the person by the person determination unit, executes a first user authentication process of capturing, with a second camera, a first target person determined to be the person by the person determination unit and collating a face image of the first target person with a face image of a registered user of the vehicle to determine whether the first target person is the registered user, the second camera being mounted on the vehicle and having a second resolution higher than the first resolution, wherein the user authentication unit stops an operation of the object detection sensor when the user authentication unit recognizes from an image captured by the second camera that the registered user gets off from the vehicle, and then the registered user is unrecognizable from the image captured by the second camera.

5. A vehicle control device comprising a processor, wherein the processor functions as:

a peripheral target recognition unit that, based on a detection signal of an object detection sensor mounted on a vehicle to detect for controlling a plurality of object detection sensors, a plurality of lightings, a plurality of first cameras, and a plurality of second cameras, the peripheral target recognition unit recognizes illuminance from images captured by the first cameras, determines whether a current time is nighttime or daytime, while the current time is determined as nighttime, always keeps the object detection sensors to be in an ON state, and when an object existing around the vehicle, recognizes a target existing around the vehicle is recognized by a detection signal of any of the plurality of the object detection sensors, the first camera and the lighting corresponding to the object detection sensor that detects the object are turned to the ON state;

a person determination unit that captures the image of the target by the first camera corresponding to the object detection sensor that detects the target and that is turned to the ON state, when the target is recognized by the peripheral target recognition unit, executes a person determination process of capturing the target with a first camera and determining based on the an image of the target whether the target is a person, the first camera being mounted on the vehicle and having a first resolution; and a user authentication unit that, when the target is determined to be the person by the person determination unit, executes a first user authentication process of capturing, with the a second camera corresponding to the object detection sensor that detects the target, a first target person determined to be the person by the person determination unit and collating a face image of the first target person with a face image of a registered user of the vehicle to determine whether the first target person is the registered user, the second camera being mounted on the vehicle and having a second resolution higher than the first resolution, wherein each of the second cameras has a resolution higher than that of the corresponding first camera, and power consumption of each of the object detection sensors is lower than that of the corresponding first camera.

* * * * *